C. H. WAKEFIELD.
Upsetting Tires.
No. 62,580
Patented March 5, 1867.
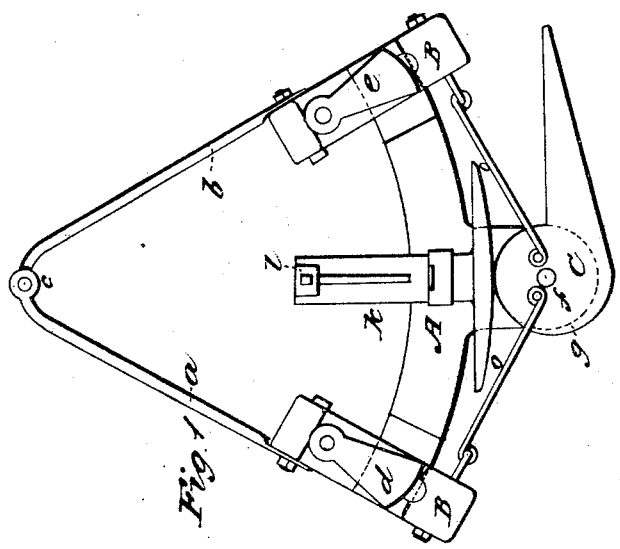
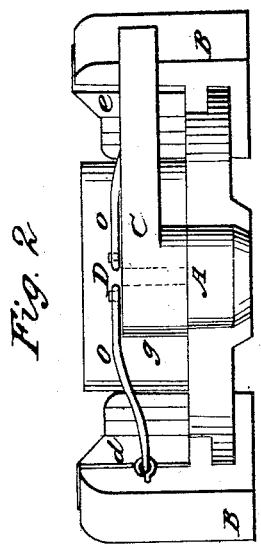
Witnesses
Geo. H. Andrews,
Samuel H. Piper.
Inventor
C. H. Wakefield
by his attorney
R. H. Eddy

United States Patent Office.

CHRISTOPHER H. WAKEFIELD, OF MONTPELIER, VERMONT.

Letters Patent No. 62,580, dated March 5, 1867.

IMPROVED MACHINE FOR SHRINKING TIRE.

*The Schedule referred to in these Letters Patent and making part of the same.*

TO ALL PERSONS TO WHOM THESE PRESENTS SHALL COME:

Be it known that I, CHRISTOPHER H. WAKEFIELD, of Montpelier, in the county of Washington, and State of Vermont, have invented an Improved Machine for Upsetting a Wheel-Tire; and I do hereby declare the same to be fully described in the following specification, and represented in the accompanying drawings, of which—

Figure 1 is a top view; and
Figure 2 an end elevation of it.

In my machine the tire is contracted by being bent laterally while held by two sets of self-adjusting jaws, as is the case when a tire is "upset" by the machine of Alonzo Stow, as described in Patent No. 55,735 granted to him. In carrying out my invention I have combined with the machine of the said Stow, mechanism for moving the two sets of jaws or drawing them toward each other, so that with my machine I produce the upsetting of the tire by a lengthwise contraction and a lateral bending of it at one and the same time, the same enabling me to obtain all the advantages of the said machine of the said Stow, and produce a machine much more powerful and expeditious in its action.

In the drawings, A is the support-bar or bed frame of the machine. It has applied to it two movable jaw-carriers B B, so applied to it as to slide freely on it in the arc of a circle, these jaw-carriers being connected by two arms $a$ $b$ projecting from them and jointed together at their outer ends, as shown at $c$. Each jaw-carrier supports two self-adjusting jaws $d$ $e$, formed and arranged on it in manner as represented, they being such as are in use in the machine of the said Stow. A cammed lever, C, formed as represented, is arranged on a fulcrum pin, $f$, extending upward from the frame A. The cam $g$ of such lever acts against and serves to move laterally a socketed slider, D, which should be so applied to the frame A as to be capable of being moved transversely thereon, both toward and away from the joint $c$ of the two arms $a$ $b$. A stop, $k$, projecting from a standard, $l$, erected on the frame A, serves to arrest the movement of the slider in one direction. The cammed lever C is connected with the two jaw-carriers by two rods $o$ $o$ jointed to it and them in manner as represented in fig. 1. From the above it will be seen that on turning the cammed lever in one direction on its fulcrum it will not only force the slider D forward, but by means of the rods $o$ $o$ it will draw the two jaw-carriers toward each other, an opposite movement of the cammed lever sufficing to move the jaw-carriers away from one another.

I do not claim a tire-upsetting machine, provided with self-adjusting jaws, a cammed lever, and a slider arranged and constructed in manner and so as to operate as represented in the patent of the said Stow.

What I claim as my invention, is—

The combination as well as the arrangement of the movable carriers B B connected as described, and their operative mechanism or rods $o$ $o$, with the self-adjusting jaws $d$ $e$, the cammed lever C, and the slider D, the whole being to operate together substantially in manner and for the purpose as hereinbefore specified.

CHRISTOPHER H. WAKEFIELD.

Witnesses:
SAML. H. SMITH,
FRED. STEVENS.